United States Patent [19]

Shimamura et al.

[11] Patent Number: 4,837,098
[45] Date of Patent: Jun. 6, 1989

[54] COLOR FILTER AND METHOD OF PRODUCING THE SAME

[75] Inventors: Masayoshi Shimamura; Tadahiro Furukawa; Akiyoshi Murakami; Toshio Haga, all of Tokyo, Japan

[73] Assignee: Kyodo Printing Co., Ltd., Japan

[21] Appl. No.: 921,047

[22] PCT Filed: Feb. 3, 1986

[86] PCT No.: PCT/JP86/00043
§ 371 Date: Sep. 19, 1986
§ 102(e) Date: Sep. 19, 1986

[87] PCT Pub. No.: WO86/04688
PCT Pub. Date: Aug. 14, 1986

[30] Foreign Application Priority Data

Feb. 5, 1985 [JP] Japan ................... 60-20731
Feb. 5, 1985 [JP] Japan ................... 60-20732

[51] Int. Cl.4 ............... G03C 5/00; G03F 9/00
[52] U.S. Cl. ................. 430/7; 430/293;
430/294; 430/321; 430/323; 430/330; 430/329;
430/394; 350/311; 350/333; 350/331 R;
350/339 F; 350/339 R
[58] Field of Search ............ 350/333, 331 R, 339 F,
350/339 R, 311; 430/7, 293, 294, 321, 323, 330,
329, 394

[56] References Cited

U.S. PATENT DOCUMENTS 4,425,416 1/1984 Ogawa .................. 430/294

FOREIGN PATENT DOCUMENTS 57-4012   1/1982  Japan .
58-40507  3/1983  Japan .
60-237403 11/1985 Japan .................. 350/311
59-222819 12/1985 Japan .

Primary Examiner—Paul R. Michl
Assistant Examiner—Cynthia Hamilton
Attorney, Agent, or Firm—Kane, Dalsimer, Sullivan, Kurucz, Levy, Eisele and Richard

[57] ABSTRACT

A technique related to color filters to be arranged on the light-receiving surface of a color liquid crystal display device, color video camera, and the like. The color filter consists of a substrate (10) and a colored filter layer (12) formed thereon. The colored filter layer (12) comprises, for example, three groups of filter picture elements (14R, 14G, 14B) having spectral characteristics respectively corresponding to red, green and blue. Each group of filter picture elements are made of polyimide resin and dye contained therein. Further, each group of the filter picture elements (R, G, B) are arranged in direct contact with one surface of the substrate (10) without using any intermediate protecting film. The first group of filter picture elements patterned on one surface of the substrate (10) are subjected to heat treatment at a high temperature of about 250° C., for example, to increase their resistance against the solvent. Then, a second coating layer for patterning the second group of filter picture elements is directly formed without using any intermediate protecting film.

9 Claims, 2 Drawing Sheets

COLOR FILTER AND METHOD OF PRODUCING THE SAME

FIELD OF THE INVENTION

This invention relates to a color filter adapted to be arranged on a light-receiving surface in a color LCD device, a color video camera or the like, and more particularly to a color filter employing polyimide having various excellent resistances such as thermal resistance, chemical resistance and light resistance. The invention also relates to a method of producing such a color filter.

PRIOR ART

A color filter of this type comprises a substrate such as a light-transmitting glass plate, and a color filter layer formed on one surface of the substrate. The color filter layer has not less than two groups of filter picture elements which are different in spectral characteristics from each other, and generally has three groups of filter picture elements corresponding respectively to red, green and blue. Each group has a number of filter picture elements having a fine pattern such as a mosaic pattern and a stripe pattern.

It is already known to use polyimide for forming the color filter. For example, Japanese Patent Application Laid-Open No. 58-46326 discloses a technique of coating each group of filter picture elements with polyimide. Japanese Patent Application Laid Open No. 59-29225 discloses a method of forming groups of filter picture elements to form a color filter layer in which after a polyimide layer is subjected to patterning, the groups of filter picture elements thus patterned are dyed in predetermined colors.

FIG. 1 shows a flow chart of a method of producing a color filter using the latter technique which color filter has three groups of filter picture elements corresponding respectively to red, green and blue and light-intercepting layers of a black color each disposed at a boundary between each adjacent filter picture elements. As shown in this Figure, with the conventional technique using dye requires, dying steps and patterning steps are carried out separately, and therefore this method has an increased number of steps and is complicated. In addition, since the polyimide layer subjected to patterning is at least in a semi-cured condition, it is difficult to disperse the coloring material uniformly and sufficiently into the polyimide layer. Thus, this method has such disadvantages.

To overcome the above disadvantages, the inventors of the present invention have proposed a method in Japanese Patent Application No. 59-201319 in which a coating layer for forming one of the groups of filter picture elements is formed using a coating solution containing a polyimide precursor solution and a coloring agent, the coating layer being then subjected to patterning by means of photolithography. FIG. 2 shows a flow chart of this method, and it will be appreciated that this method is considerably simplified in comparison with the method of FIG. 1.

According to the above method proposed by the present inventors, each group of filter picture elements can be formed relatively easily. However, each time each group of filter picture elements are to be formed, an intermediate protective layer must be formed to protect the precedingly-formed group of picture element. The same procedure is also required for the conventional process of FIG. 1.

The formation of such an intermediate protective layer not only makes the production of the color filter complicated but also makes the overall thickness of the color filter greater. In addition, this adversely affects a flatness of a surface of the color filter, which affects display characteristics and thinnes of a flat panel display such as a color LCD device.

In order to overcome the above problems, the present inventors have aimed at eliminating the intermediate protective layer and made extensive study and found the following.

When the second group of filter picture elements are formed without coating the first group of the filter picture elements with the protective layer, each filter picture element of the first group is damaged when the coating solution for forming the second group of filter picture elements is applied, but is hardly damaged at the time of etching for forming the pattern. The word "damage" here means that the first or preceding group of filter picture elements are subjected to cracks and wrinkles, and that the coloring material in the filter picture element dissolves therefrom, and that the filter picture element itself dissolves. It is thought that such phenomena are caused a solvent contained in the coating solution for forming the second group of filter picture elements.

DISCLOSURE OF THE INVENTION

It is an object of this invention to provide a color filter which eliminates the use of the above-mentioned intermediate protective layer, and enables a flatness of a surface of the color filter, and can make the overall thickness of the color filter smaller.

Another object of this invention is to provide a method of producing a color filter in which the above-mentioned intermediate protective layer can be omitted by imparting solvent-resistance, that is, a resistance to a solvent which solves a polyimide precursor solution, to the precedingly-formed group of filter picture elements.

A further object of this invention is to provide a technique of producing a color filter in which a dye which is soluble in the polyimide precursor solution is used as a coloring agent for coloring the polyimide, so that the coating solution has a uniform tinting and excellent coating properties.

The color filter according to the present invention of which cross-section is shown in FIG. 3 comprises a substrate 10 such as a light-transmitting glass plate, and a color filter layer 12 formed on one surface of the substrate 10. The color filter layer 12 comprises, for example, three groups of filter picture elements 14R, 14G and 14B having respective spectral characteristics corresponding respectively to red, green and blue. Each group has a number of filter picture elements R, G and B. The size of each filter picture element varies depending on the size of a light-receiving surface. For example, in a color liquid crystal television of a small size, the filter picture element has a square shape of a mosaic pattern one of longitudinal and transverse sides of which has several tens to several hundreds $\mu$m. Thus, the picture elements are arranged on the one surface of the substrate 10 in a matrix manner, and the arrangement is usually such that each adjacent filter picture elements have different colors, that is, different spectral characteristics. As cross-sectionally shown in FIG. 4 as in FIG. 3, light-intercepting layers 16 for intercepting light may be disposed at boundaries between adjacent filter picture elements R, G and B of the three groups 14R, 14G and 14B. The light-intercepting layers assumes a grid-like shape.

The filter picture elements R, G, B of each of the groups 14R, 14G and 14B are arranged on the one surface of the substrate in direct contact therewith. The thickness of the layer of each filter picture element R, G, B varies depending on the color strength to be desired. For example, it is approximately 0.5 to 2.0μm, and preferably it is approximately 0.75 to 1.5μm. Therefore, the difference in the layer thickness between the different filter picture elements is almost negligible, and the surface of the color filter 12 according to the present invention is flat and the color filter is thin as a whole. Other than an ordinarily-used glass plate, other light-transmitting material, such as a plastics plate, a flexible plastics film and a semi-conductor board incorporating electric elements, is used as the substrate 10. In a color LCD device, a transparent electrode layer consisting one of a common electrode and a picture element electrode is formed on one side of the color filter. In the case where the transparent electrode layer is formed on the underside of the color filter, the transparent electrode layer is, of course, pre-formed on the one surface of the substrate 10.

Each of the filter picture elements R, G and B comprises polyimide having excellent thermal resistance and light resistance, and a dye retained therein. It is preferred that the polyimide is excellent in transparency in order not to affect a light-transmitting ability required for the color filter. It is also preferred that the dye for effecting the coloring is excellent in thermal resistance and has an excellent solubility to the polyimide. Other than dye, the use of pigment for coloring the polyimide may be considered. However, in the case of pigment, the pigment is in the form of particles having a particle size, for example, of about 0.1 to 0.3μm, and is liable to produce secondary particles, thereby increasing the particle size, so that it is difficult to disperse uniformly in the polyimide. In addition, the dispersed solids cause unevenness and stripes in the coating layer when the coating layer for the patterning of the filter picture elements is formed. On the other hand, the use of dye eliminates such problems. The polyimide can be easily patterned by means of photolithography which uses a photoresist as a mask. In this case, the polyimide is prepared as a polyimide precursor solution. The polyimide precursor solution comprises a solvent of a high polarity such as N-methyl-2-pyrrolidone and polyamic acid as polyimide precursor. Commercially-available and easily-available polyimide precursor solution is, for example, a stock solution of high viscosity of about 1200 centipoise. This highly-viscous solution can be diluted using N, N-dimethyl acetamide, N, N-dimethyl formamide, N-methyl-2-pyrrolidone, cycloxanone, carbitol derivatives, or cellosolve derivatives. For example, it can be adjusted to a suitable viscosity of several tens to several hundreds centipoise suited for a rotary coating operation. The dye can be sufficiently dissolved in such a solvent, so that it can be dispersed in the polyimide precursor solution easily and uniformly. In addition, when forming the coating layer, the dye having a solubility will not cause the above problems encountered with the pigment. The dye for each group of filter picture elements can be one kind of dye or can be made by mixing two or three kinds of dyes together, and it is preferred that the amount of the dye used is as much as possible to provide a high color strength. However, if the amount is unduly excessive, there is encountered the disadvantage that the dye escape into the photoresist at a later step, a release agent for releasing the photoresist, and the subsequent upper coating layer. Therefore, preferably, the amount should be increased to such an extent than the dye will not escape. It is appropriate that the amount of dye used is equal to that of the polyimide in terms of weight %.

In the present invention, the temperature of the heat treatment for the precedingly-patterned filter picture elements, that is, the temperature of the post-baking is as high as possible so long as the thermal resistance of the dye is maintained, thereby promoting the conversion of the polyamic acid into the polyimide.

The conversion of the polyamic acid into the polyimide proceeds when the polyamic acid is dehydrated and is subjected to ring closure. The degree of proceeding becomes higher as the temperature of the heat treatment becomes higher. As to the polyimide of the heat-dehydration type, if the conversion is not carried out at a heat treatment temperature of about 400° C., the conversion is not complete. However, since the coating layer for forming the filter picture elements is formed by adding the coloring dye to the polyimide precursor solution, the upper limit of the temperature of the post-baking is limited by the thermal resistance of the dye. Therefore, it is preferred that dye of the type which can be well mixed in the polyimide precursor solution and has a high thermal resistance is used as the coloring dye. Suitable examples of such dyes are shown in Table 1 below. In Table 1, the thermal resistance of 250° C. means that when the heat treatment is carried out at 250° C. for a long time, the dye is somewhat subjected to fading but is practically usable. And, the thermal resistance of not less than 250° C. means that when the heat treatment is carried out at 250° C. for a long time, the dye is not subjected to any deterioration such as fading.

TABLE 1

| Color | Kind | (coloring dyes) Color index name | thermal resistance |
|---|---|---|---|
| Yellow | Azo dye | Solvent Yellow 19 | 250° C. |
| | | Solvent Yellow 21 | not less than 250° C. |
| | | Solvent Yellow 77 | 250° C. |
| | | Solvent Yellow 83 | not less than 250° C. |
| Red | Azo dye | Solvent Red 122 | not less than 250° C. |
| | Antraquinone dye | — | not less than 250° C. |
| Blue | Antraquinone dye | Acid Blue 129 | 250° C. |
| | Azine dye | Solvent Blue 49 | 250° C. |
| | Phtalocyanine dye | Solvent Blue 25 | not less than 250° C. |
| | Triphenyl-methane dye | Acid Blue 9 | not less than 250° C. |
| Black | Azo dye | Acid Black 155 | not less than 250° C. |

With respect to those dyes having a relatively low thermal resistance, it is preferred that a resin-surface modifier is added to the coating solution so as to impart water repellency and oil repellency to the surface of the coating layer. The resin-surface modifier imparts solvent resistance to the groups of filter picture elements and a block polymer having a functional segment having an excellent migration of resin like a perfluoroalkyl group and having water repellency and oil repellency. A block polymer of vinyl monomers having, in addition to a functional segment, a compatible segment compatible with polyimide like an acrylic polymer is particularly preferred since the water and oil repellency is semi-permanent. Further, as the resin-surface modifier, a graft polymer of a functional comb shape which is synthesized by a copolymer of a macro monomer and a functional monomer and has an excellent interface-migrating property can be used. Further, as the resin-surface modifier, a mixture of a graft polymer of a functional comb shape and the above block polymer. The amount of the resin-surface modifier is usually 1 to 3%. If this amount is increased, the water and oil repellency is enhanced, but for example, if the amount is 5 to 10%, the uniformity of the coating layer for forming the groups of filter picture elements is lowered. Therefore, it is preferred that the amount is in such a range as not to lower the uniformity of the coating layer.

As is shown in a flow chart of the method of the present invention in FIG. 5, steps of forming intermediate protective layers for protecting the precedingly-formed groups of filter picture elements are totally omitted. When the light-intercepting layers and the groups of filter picture elements are all heat treated at high temperatures, so that the solvent resistance is sufficiently enhanced, a transparent protective layer covering the uppermost layer of the color filter, i.e., a top coat, can be omitted.

THE PREFERRED EMBODIMENT OF THE INVENTION

Figure 1:
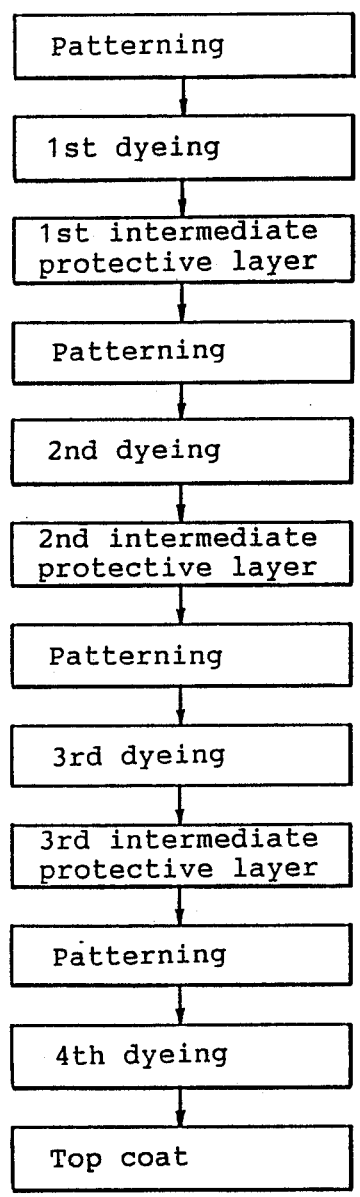
FIG. 1 is a flow chart of a process utilizing a conventional dyeing method.
Figure 2:
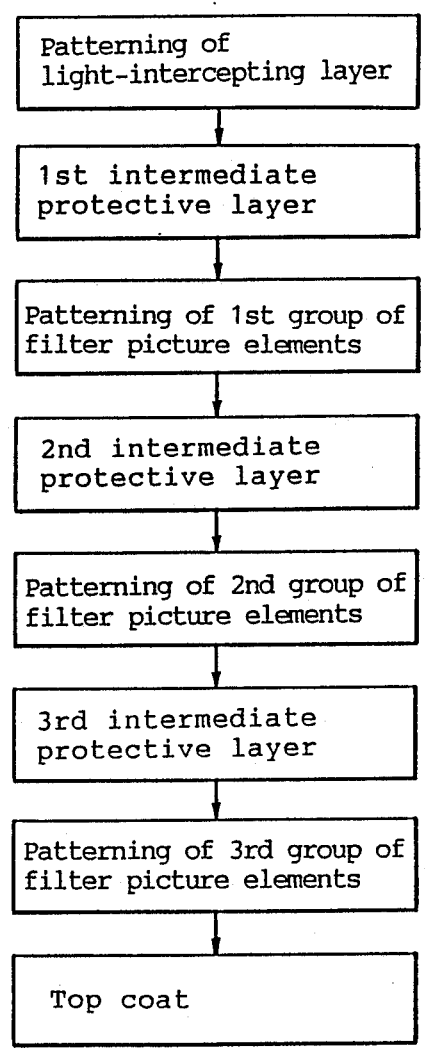
FIG. 2 is a flow chart of the earlier-proposed process.
Figure 3:
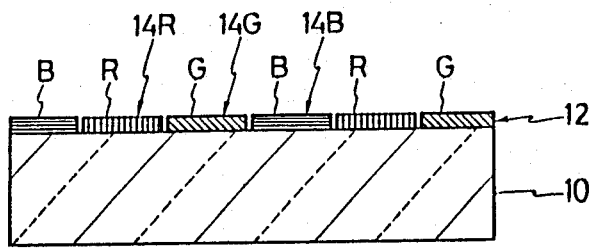
FIG. 3 is a cross-sectional view of a color filter according to one embodiment of the present invention.
Figure 4:
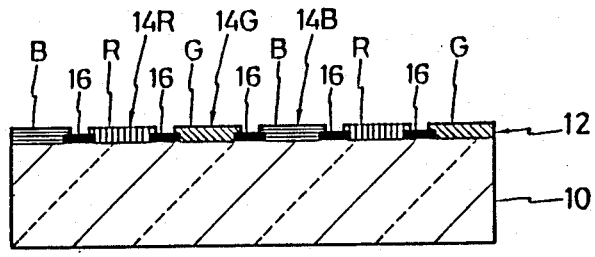
FIG. 4 is a cross-sectional view of a color filter according to another embodiment of the present invention.
Figure 5:
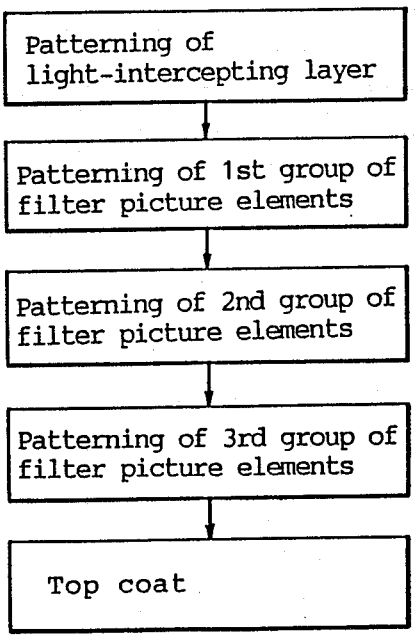
FIG. 5 is a flow chart of the process according to the present invention.

The three groups of filter picture elements 14R, 14G and 14B having the respective spectral characteristics corresponding respectively to red, blue and green as well as the grid-like light-intercepting layer 16 were formed on the one surface of the substrate 10 of a glass plate under the following conditions to form the color filter of FIG. 4 for use in a color LCD device. No damage of a nature mentioned above was found in the light-intercepting black layer 16, the group of blue filter picture elements 14b and the group of red filter picture elements 14R, and the color filter thus obtained was of a good quality although it had no intermediate protective layer. Compositions of the coating solutions and the formations of the groups of filter picture elements 14R, 14G and 14B are as follows:

| COATING SOLUTIONS | |
|---|---|
| (Light-intercepting layer 16) | |
| Solvent black 3 | 1.0 g |
| Polyimide precursor solution | 5.0 g |
| (Semicofine manufactured by Toray Industries, Inc.) | |
| Methyl cellosolve | 15.0 g |
| Silane coupling agent | 0.02 g |
| (Group of blue filter picture elements 14B) | |
| Acid blue 129 | 0.32 g |
| Polyimide precursor solution | 5.0 g |
| (Semicofine manufactured by Toray Industries, Inc.) | |

| -continued | |
|---|---|
| COATING SOLUTIONS | |
| Methyl cellosolve | 7.5 g |
| Silane coupling agent | 0.02 g |
| (Group of red filter picture elements 14R) | |
| Acid red 257 | 0.5 g |
| Polyimide precursor solution | 5.0 g |
| (Semicofine manufactured by Toray Industries, Inc.) | |
| Methyl cellosolve | 8.5 g |
| Silane coupling agent | 0.02 g |
| Resin-surface modifier | 0.02 g |
| (Group of green filter picture elements 14G) | |
| Solvent yellow 77 | 0.5 g |
| Acid blue 7 | 0.5 g |
| Polyimide precursor solution | 5.0 g |
| (Semicofine manufactured by Toray Industries, Inc.) | |
| Methyl cellosolve | 8.5 g |
| Silane coupling agent | 0.02 g |

Each of the coating solutions, before being applied, was passed through a filter having a pore size of 0.5μm to remove foreign matters.

(a) FORMATIONS OF PATTERNS

Each of the above coating solutions was applied by a spinner for 60 to 90 seconds, the spinner rotating at a speed of 1000 rpm. Then, the coating layer was left at room temperatures for 30 minutes for leveling purposes.

(b) FIRST PRE-BAKING

The substrate 10 was placed on a hot plate heated to 120° to 170° C. and dried for 3 to 15 minutes.

(c) COATING OF PHOTORESIST AND EXPOSURE TO LIGHT

Positive-type photoresist was applied by a rotary coater and dried by a hot plate at a temperature of 125° C. for 3 minutes and then was exposed through a photomask to ultraviolet light emitted from an ultra-high pressure mercury vapor lamp. The energy of the exposure was 80 mJ/cm$^2$.

(d) DEVELOPMENT AND ETCHING

The developing was carried out using a developer of aqueous sodium hydroxide of 0.1 to 0.3N, and the coating layer was subjected to etching.

(e) RELEASE OF PHOTORESIST

Those portions of the photoresist not exposed to the light were removed using cellosolve acetate.

(f) POST-BAKING

The heat treatment was carried out in the air at 250° C. for 30 to 60 minutes.

The above steps were carried out for each color to complete the above color filter.

Industrial Applicability

As described above, the present invention is suited for the color filter for color display or color separation for use in a color LCD device, a color video camera and the like, and particularly is best suited for such a device having picture elements of a high density and such a device having a large light-receiving surface since the flatness of the color filter surface and the reduction of the thickness of the color filter are achieved.

What is claimed is:

1. A method of producing a color filter adapted to be placed on a light-receiving surface comprising (a) a substrate having one surface parallel to the light-receiving surface, and (b) a color filter layer formed on said one surface of said substrate, said color filter layer comprising at not less than two groups of filter picture elements having different spectral characteristics, each of the groups being composed of a number of said filter picture elements, said method comprising the steps of:

(A) applying to said one surface of said substrate a coating solution comprising a polyimide precursor solution and a first color dye dissolved in said polyimide precursor solution to form a first coating layer for forming one of said not less than two groups of filter picture elements;

(B) patterning said first coating layer by photolithography to form a pattern of a first group of filter picture elements;

(C) heat treating the patterned first group of filter picture elements at temperatures which said first dye withstands, thereby enhancing solvent resistance of said first group of filter picture elements;

(D) applying directly to said one surface of said substrate, having said first group of filter picture elements thereon, a coating solution comprising a polyimide precursor solution and a second coloring dye dissolved in said polyimide precursor solution to form a second coating layer for forming another of said not less than two groups of filter picture elements;

(E) patterning said second coating layer by photolithography to form a pattern of a second group of filter picture elements; and (F) heat treating the patterned second group of filter picture elements at temperatures which said second dye withstands, thereby enhancing solvent resistance of said second group of filter picture elements.

2. A method according to claim 1, in which each of said coating solutions is adjusted to a viscosity suitable for coating by adding a diluting solvent to said polyimide precursor solution.

3. A method according to claim 1 or claim 2, in which each of said coating layers is formed by a rotary coater.

4. A method according to claim 1, in which said heat treating is effected at a temperature of around 250° C.

5. A method according to claim 1, in which at least one of said coating solutions contains a resin surface modifier for imparting water repellency and oil repellency to a surface of said coating layer.

6. A method of producing a color filter according to claim 1, in which the patterning of each of said first and second groups of filter picture elements is carried out by masking each coating layer with a photoresist and etching each coating layer simultaneously with the developing treatment of photoresist.

7. A method of producing color filter according to claim 6, in which said each coating layer is subjected to heat treatment for drying before a film of the photoresist is formed.

8. A method of producing a color filter according to claim 6, in which said each coating layer is etched by a chemical solution.

9. A method according to claim 1, further comprising repeating said steps (D), (E), and (F) to pattern the remainder of said not less than two groups of filter picture elements.

* * * * *